United States Patent
Aabye et al.

(10) Patent No.: US 10,332,094 B2
(45) Date of Patent: Jun. 25, 2019

(54) RECORDATION OF ELECTRONIC PAYMENT TRANSACTION INFORMATION

(71) Applicants: Christian Aabye, Morgan Hill, CA (US); Hao Ngo, San Jose, CA (US); David William Wilson, Camberley (GB); Guido Mangiagalli, Wimbledon (GB)

(72) Inventors: Christian Aabye, Morgan Hill, CA (US); Hao Ngo, San Jose, CA (US); David William Wilson, Camberley (GB); Guido Mangiagalli, Wimbledon (GB)

(73) Assignee: Visa International Service Association, San Francisco, CA (US)

( * ) Notice: Subject to any disclaimer, the term of this patent is extended or adjusted under 35 U.S.C. 154(b) by 116 days.

(21) Appl. No.: 14/609,343

(22) Filed: Jan. 29, 2015

(65) Prior Publication Data

US 2015/0213560 A1    Jul. 30, 2015

Related U.S. Application Data

(63) Continuation of application No. 12/563,430, filed on Sep. 21, 2009, now Pat. No. 8,977,567.

(Continued)

(51) Int. Cl.
    *G06Q 20/32*     (2012.01)
    *G06Q 20/10*     (2012.01)
    (Continued)

(52) U.S. Cl.
    CPC .......... *G06Q 20/32* (2013.01); *G06Q 20/10* (2013.01); *G06Q 20/20* (2013.01); *G06Q 20/202* (2013.01);
    (Continued)

(58) Field of Classification Search
    CPC ...... G06Q 20/202; G06Q 20/20; G06Q 20/32; G06Q 20/40; G06Q 20/04
    (Continued)

(56) References Cited

U.S. PATENT DOCUMENTS

| 4,044,231 A | 8/1977 | Beck et al. |
| 4,613,904 A | 9/1986 | Lurie |

(Continued)

FOREIGN PATENT DOCUMENTS

| EP | 1096439 | 5/2001 |
| EP | 1136961 | 9/2001 |

(Continued)

OTHER PUBLICATIONS

U.S. Appl. No. 12/563,421, "Non-Final Office Action", dated Jun. 5, 2015, 22 pages.

(Continued)

Primary Examiner — Shahid Merchant
Assistant Examiner — Michael J Warden
(74) Attorney, Agent, or Firm — Kilpatrick Townsend & Stockton LLP

(57) ABSTRACT

A system, apparatus, and method for processing payment transactions that are conducted using a mobile device that includes a contactless element, such as an integrated circuit chip. An account holder is enabled to generate transaction related data and append that data to a transaction record or transaction identifier. The appended data and transaction record or identifier may be stored in the mobile payment device and/or provided to an Issuer. If provided to an Issuer, the transaction related data generated by the account holder may be used to supplement an account statement. The additional information generated by the account holder may be used to assist the account holder in determining if a transaction is valid by providing information that helps the (Continued)

account holder to recall the location or other aspect of the transaction.

20 Claims, 5 Drawing Sheets

Related U.S. Application Data

(60) Provisional application No. 61/099,060, filed on Sep. 22, 2008.

(51) Int. Cl.
    *G06Q 20/20*     (2012.01)
    *G06Q 20/40*     (2012.01)
    *G06Q 20/38*     (2012.01)
    *G06Q 40/00*     (2012.01)

(52) U.S. Cl.
    CPC ......... *G06Q 20/204* (2013.01); *G06Q 20/322* (2013.01); *G06Q 20/3224* (2013.01); *G06Q 20/3278* (2013.01); *G06Q 20/382* (2013.01); *G06Q 20/3829* (2013.01); *G06Q 20/40* (2013.01); *G06Q 40/12* (2013.12)

(58) Field of Classification Search
    USPC ................................ 705/21, 16, 14.25, 14.36
    See application file for complete search history.

(56) References Cited

U.S. PATENT DOCUMENTS

| | | |
|---|---|---|
| 4,614,861 A | 9/1986 | Pavlov et al. |
| 4,674,041 A | 6/1987 | Lemon et al. |
| 4,701,601 A | 10/1987 | Francini et al. |
| 4,868,376 A | 9/1989 | Lessin et al. |
| 5,034,597 A | 7/1991 | Atsumi et al. |
| 5,305,196 A | 4/1994 | Deaton et al. |
| 5,327,508 A | 7/1994 | Deaton et al. |
| 5,353,218 A | 10/1994 | De Lapa et al. |
| 5,359,183 A | 10/1994 | Skodlar |
| 5,388,165 A | 2/1995 | Deaton et al. |
| RE34,915 E | 4/1995 | Nichtberger et al. |
| 5,420,606 A | 5/1995 | Begum et al. |
| 5,430,644 A | 7/1995 | Deaton et al. |
| 5,448,471 A | 9/1995 | Deaton et al. |
| 5,465,206 A | 11/1995 | Hilt et al. |
| 5,477,038 A | 12/1995 | Levine et al. |
| 5,483,444 A | 1/1996 | Heintzeman et al. |
| 5,500,513 A | 3/1996 | Langhans et al. |
| 5,502,636 A | 3/1996 | Clarke |
| 5,530,438 A | 6/1996 | Bickham et al. |
| 5,564,073 A | 10/1996 | Takahisa |
| 5,577,266 A | 11/1996 | Takahisa et al. |
| 5,579,537 A | 11/1996 | Takahisa |
| 5,592,560 A | 1/1997 | Deaton et al. |
| 5,604,921 A | 2/1997 | Alanara |
| 5,615,110 A | 3/1997 | Wong |
| 5,621,201 A | 4/1997 | Langhans et al. |
| 5,621,812 A | 4/1997 | Deaton et al. |
| 5,627,549 A | 5/1997 | Park |
| 5,638,457 A | 6/1997 | Deaton et al. |
| 5,642,485 A | 6/1997 | Deaton et al. |
| 5,644,723 A | 7/1997 | Deaton et al. |
| 5,649,114 A | 7/1997 | Deaton et al. |
| 5,659,165 A | 8/1997 | Jennings et al. |
| 5,659,469 A | 8/1997 | Deaton et al. |
| 5,675,662 A | 10/1997 | Deaton et al. |
| 5,678,939 A | 10/1997 | Ross |
| 5,687,322 A | 11/1997 | Deaton et al. |
| 5,708,422 A | 1/1998 | Blonder et al. |
| 5,710,886 A | 1/1998 | Christensen et al. |
| 5,717,866 A | 2/1998 | Naftzger |
| 5,761,648 A | 6/1998 | Golden et al. |
| 5,777,903 A | 7/1998 | Piosenka et al. |
| 5,791,991 A | 8/1998 | Small |
| 5,793,972 A | 8/1998 | Shane |
| 5,806,044 A | 9/1998 | Powell |
| 5,822,735 A | 10/1998 | De Lapa et al. |
| 5,855,007 A | 12/1998 | Jovicic et al. |
| 5,870,030 A | 2/1999 | Deluca et al. |
| 5,878,141 A * | 3/1999 | Daly ...................... G06Q 20/04 235/379 |
| 5,884,277 A | 3/1999 | Khosla |
| 5,905,246 A | 5/1999 | Fajkowski |
| 5,907,830 A | 5/1999 | Engel et al. |
| 5,924,080 A | 7/1999 | Johnson |
| 5,945,653 A | 8/1999 | Walker et al. |
| 5,959,577 A | 9/1999 | Fan et al. |
| 5,974,399 A | 10/1999 | Giuliani et al. |
| 5,991,749 A | 11/1999 | Morrill, Jr. |
| 6,002,771 A | 12/1999 | Nielsen |
| 6,009,411 A | 12/1999 | Kepecs |
| 6,009,415 A | 12/1999 | Shurling et al. |
| 6,012,038 A | 1/2000 | Powell |
| 6,014,634 A | 1/2000 | Scroggie et al. |
| 6,018,718 A | 1/2000 | Walker et al. |
| 6,029,151 A | 2/2000 | Nikander |
| 6,035,280 A | 3/2000 | Christensen |
| 6,041,309 A | 3/2000 | Laor |
| 6,049,778 A | 4/2000 | Walker et al. |
| 6,055,505 A | 4/2000 | Elston |
| 6,062,472 A | 5/2000 | Cheung |
| 6,062,991 A | 5/2000 | Moriarty et al. |
| 6,064,990 A | 5/2000 | Goldsmith |
| 6,067,526 A | 5/2000 | Powell |
| 6,067,529 A | 5/2000 | Ray et al. |
| 6,076,068 A | 6/2000 | Delapa et al. |
| 6,076,069 A | 6/2000 | Laor |
| 6,076,101 A | 6/2000 | Kamakura et al. |
| 6,128,599 A | 10/2000 | Walker et al. |
| 6,185,290 B1 | 2/2001 | Shaffer et al. |
| 6,185,541 B1 | 2/2001 | Scroggie et al. |
| 6,227,447 B1 | 5/2001 | Campisano |
| 6,237,145 B1 | 5/2001 | Narasimhan et al. |
| 6,247,129 B1 | 6/2001 | Keathley et al. |
| 6,267,292 B1 | 7/2001 | Walker et al. |
| 6,279,112 B1 | 8/2001 | O'toole, Jr. et al. |
| 6,292,786 B1 * | 9/2001 | Deaton .............. G06Q 20/0457 705/14.25 |
| 6,307,958 B1 | 10/2001 | Deaton et al. |
| 6,318,631 B1 | 11/2001 | Halperin |
| 6,321,208 B1 | 11/2001 | Barnett et al. |
| 6,330,543 B1 | 12/2001 | Kepecs |
| 6,330,550 B1 | 12/2001 | Brisebois et al. |
| 6,334,108 B1 | 12/2001 | Deaton et al. |
| 6,336,098 B1 | 1/2002 | Fortenberry et al. |
| 6,336,099 B1 | 1/2002 | Barnett et al. |
| 6,341,724 B2 | 1/2002 | Campisano |
| 6,351,735 B1 | 2/2002 | Deaton et al. |
| 6,377,935 B1 | 4/2002 | Deaton et al. |
| 6,378,775 B2 | 4/2002 | Hayashida |
| 6,381,324 B1 | 4/2002 | Shaffer et al. |
| 6,424,949 B1 | 7/2002 | Deaton et al. |
| 6,424,951 B1 | 7/2002 | Shurling et al. |
| 6,434,534 B1 | 8/2002 | Walker et al. |
| 6,470,181 B1 | 10/2002 | Maxwell |
| 6,484,146 B2 * | 11/2002 | Day ...................... G06Q 20/20 705/14.14 |
| 6,488,203 B1 | 12/2002 | Stoutenburg et al. |
| 6,505,046 B1 | 1/2003 | Baker |
| 6,516,302 B1 | 2/2003 | Deaton et al. |
| 6,529,725 B1 | 3/2003 | Joao et al. |
| 6,535,855 B1 | 3/2003 | Cahill et al. |
| 6,557,752 B1 | 5/2003 | Yacoob |
| 6,560,581 B1 | 5/2003 | Fox et al. |
| 6,584,309 B1 | 6/2003 | Whigham |
| 6,587,835 B1 | 7/2003 | Treyz et al. |
| 6,601,040 B1 | 7/2003 | Kolls |
| 6,601,759 B2 | 8/2003 | Fife et al. |
| 6,609,104 B1 | 8/2003 | Deaton et al. |
| 6,611,811 B1 | 8/2003 | Deaton et al. |
| 6,631,849 B2 | 10/2003 | Blossom |
| 6,647,257 B2 | 11/2003 | Owensby |

(56) References Cited

U.S. PATENT DOCUMENTS

| | | |
|---|---|---|
| 6,647,269 B2 | 11/2003 | Hendrey et al. |
| 6,664,948 B2 | 12/2003 | Crane et al. |
| 6,684,195 B1 | 1/2004 | Deaton et al. |
| 6,685,093 B2 | 2/2004 | Challa et al. |
| 6,736,322 B2 | 5/2004 | Gobburu et al. |
| 6,747,547 B2 | 6/2004 | Benson |
| 6,775,539 B2 | 8/2004 | Deshpande |
| 6,832,721 B2 | 12/2004 | Fujii |
| 6,837,425 B2 | 1/2005 | Gauthier et al. |
| 6,868,391 B1 | 3/2005 | Hultgren |
| 6,877,665 B2 | 4/2005 | Challa et al. |
| 6,912,398 B1 | 6/2005 | Domnitz |
| 6,915,272 B1 * | 7/2005 | Zilliacus ............... G06Q 20/02 705/26.8 |
| 6,920,611 B1 | 7/2005 | Spaeth et al. |
| 6,934,689 B1 | 8/2005 | Ritter et al. |
| 6,965,992 B1 | 11/2005 | Joseph et al. |
| 6,975,852 B1 | 12/2005 | Sofer et al. |
| 6,990,330 B2 | 1/2006 | Veerepalli et al. |
| 7,003,497 B2 | 2/2006 | Maes |
| 7,007,840 B2 | 3/2006 | Davis |
| 7,013,286 B1 | 3/2006 | Aggarwal et al. |
| 7,025,256 B1 | 4/2006 | Drummond et al. |
| 7,028,906 B2 | 4/2006 | Challa et al. |
| 7,039,611 B2 | 5/2006 | Devine |
| 7,040,533 B1 | 5/2006 | Ramachandran |
| 7,051,923 B2 | 5/2006 | Nguyen et al. |
| 7,055,031 B2 | 5/2006 | Platt |
| 7,076,329 B1 | 7/2006 | Kolls |
| 7,089,208 B1 | 8/2006 | Levchin et al. |
| 7,099,850 B1 | 8/2006 | Mann, II et al. |
| 7,104,446 B2 | 9/2006 | Bortolin et al. |
| 7,107,250 B2 | 9/2006 | Harrison |
| 7,110,954 B2 | 9/2006 | Yung et al. |
| 7,121,456 B2 | 10/2006 | Spaeth et al. |
| 7,124,937 B2 | 10/2006 | Myers et al. |
| 7,136,835 B1 | 11/2006 | Flitcroft et al. |
| 7,150,393 B1 | 12/2006 | Drummond et al. |
| 7,152,780 B2 | 12/2006 | Gauthier et al. |
| 7,159,770 B2 | 1/2007 | Onozu |
| 7,194,437 B1 | 3/2007 | Britto et al. |
| 7,201,313 B1 | 4/2007 | Ramachandran |
| 7,203,300 B2 | 4/2007 | Shaffer et al. |
| 7,207,477 B1 | 4/2007 | Ramachandran |
| 7,231,357 B1 | 6/2007 | Shanman et al. |
| 7,231,372 B1 | 6/2007 | Prange et al. |
| RE39,736 E | 7/2007 | Morrill, Jr. |
| 7,243,853 B1 | 7/2007 | Levy et al. |
| 7,257,545 B1 | 8/2007 | Hung |
| 7,280,981 B2 | 10/2007 | Huang et al. |
| 7,290,704 B1 | 11/2007 | Ball et al. |
| 7,308,254 B1 | 12/2007 | Rissanen |
| 7,343,149 B2 | 3/2008 | Benco et al. |
| 7,350,702 B2 | 4/2008 | Bortolin et al. |
| 7,353,187 B1 | 4/2008 | Emodi et al. |
| 7,356,516 B2 | 4/2008 | Richey et al. |
| 7,357,310 B2 | 4/2008 | Calabrese et al. |
| 7,407,094 B2 | 8/2008 | Myers et al. |
| 7,440,771 B2 | 10/2008 | Purk |
| 7,447,662 B2 | 11/2008 | Gibson |
| 7,464,867 B1 | 12/2008 | Kolls |
| 7,496,527 B2 | 2/2009 | Silverstein et al. |
| 7,500,606 B2 | 3/2009 | Park et al. |
| 7,552,094 B2 * | 6/2009 | Park ....................... G06Q 20/10 705/14.23 |
| 7,631,803 B2 | 12/2009 | Peyret et al. |
| 7,716,129 B1 | 5/2010 | Tan et al. |
| 7,945,240 B1 | 5/2011 | Klock et al. |
| 7,970,669 B1 | 6/2011 | Santos |
| 7,992,781 B2 | 8/2011 | Hammad |
| 8,019,365 B2 | 9/2011 | Fisher |
| 8,135,362 B2 | 3/2012 | LaDue |
| 8,170,527 B2 | 5/2012 | Granucci et al. |
| 8,977,567 B2 | 3/2015 | Aabye et al. |
| 2001/0013542 A1 | 8/2001 | Horowitz et al. |
| 2002/0013711 A1 | 1/2002 | Ahuja et al. |
| 2002/0030579 A1 * | 3/2002 | Albert ................ G06Q 20/0855 340/5.9 |
| 2002/0065680 A1 * | 5/2002 | Kojima ................ G06Q 20/20 705/21 |
| 2002/0065713 A1 | 5/2002 | Awada et al. |
| 2002/0065727 A1 * | 5/2002 | Enoki ................ G06Q 20/202 705/21 |
| 2002/0073025 A1 | 6/2002 | Tanner et al. |
| 2002/0082926 A1 * | 6/2002 | Shuster ................ G06Q 20/10 705/21 |
| 2002/0082927 A1 * | 6/2002 | Borenstein ............ G06Q 20/20 705/21 |
| 2002/0091569 A1 | 7/2002 | Kitaura et al. |
| 2002/0095344 A1 * | 7/2002 | Mares ................ G06Q 20/04 705/21 |
| 2002/0107745 A1 * | 8/2002 | Loeser ................ G06Q 20/04 705/21 |
| 2002/0128903 A1 | 9/2002 | Kernahan |
| 2002/0161701 A1 | 10/2002 | Warmack |
| 2002/0165775 A1 | 11/2002 | Tagseth et al. |
| 2002/0169674 A1 * | 11/2002 | Nohara ................ G06Q 20/202 705/21 |
| 2002/0190118 A1 | 12/2002 | Davenport et al. |
| 2002/0194075 A1 * | 12/2002 | O'Hagan ............. G06Q 20/201 705/21 |
| 2002/0194137 A1 * | 12/2002 | Park ....................... G06Q 20/10 705/64 |
| 2002/0198777 A1 | 12/2002 | Yuasa |
| 2003/0004808 A1 | 1/2003 | Elhaoussine et al. |
| 2003/0004812 A1 * | 1/2003 | Kasasaku ............... G06Q 20/20 705/21 |
| 2003/0046168 A1 * | 3/2003 | Muller ................ G06Q 20/202 705/21 |
| 2003/0058261 A1 | 3/2003 | Challa et al. |
| 2003/0083946 A1 * | 5/2003 | Nishiyama ............ G06Q 20/02 705/21 |
| 2003/0120593 A1 | 6/2003 | Bansal et al. |
| 2003/0126078 A1 | 7/2003 | Vihinen |
| 2003/0144907 A1 | 7/2003 | Cohen, Jr. et al. |
| 2003/0149662 A1 | 8/2003 | Shore |
| 2003/0154139 A1 | 8/2003 | Woo |
| 2003/0172036 A1 | 9/2003 | Feigenbaum |
| 2003/0172040 A1 | 9/2003 | Kemper et al. |
| 2003/0212595 A1 | 11/2003 | Antonucci |
| 2003/0212601 A1 | 11/2003 | Silva et al. |
| 2003/0212642 A1 | 11/2003 | Weller et al. |
| 2003/0220835 A1 | 11/2003 | Melvin, Jr. |
| 2003/0225618 A1 | 12/2003 | Hessburg et al. |
| 2003/0229588 A1 | 12/2003 | Falk et al. |
| 2003/0230630 A1 | 12/2003 | Whipple et al. |
| 2003/0233292 A1 | 12/2003 | Richey et al. |
| 2004/0019522 A1 | 1/2004 | Bortolin et al. |
| 2004/0030601 A1 | 2/2004 | Pond et al. |
| 2004/0038690 A1 | 2/2004 | Lee et al. |
| 2004/0044621 A1 | 3/2004 | Huang et al. |
| 2004/0049455 A1 | 3/2004 | Mohsenzadeh |
| 2004/0050922 A1 | 3/2004 | Gauthier et al. |
| 2004/0054575 A1 | 3/2004 | Marshall |
| 2004/0054581 A1 | 3/2004 | Redford et al. |
| 2004/0054590 A1 | 3/2004 | Redford et al. |
| 2004/0054591 A1 | 3/2004 | Spaeth et al. |
| 2004/0063494 A1 | 4/2004 | Oram et al. |
| 2004/0064406 A1 | 4/2004 | Yates et al. |
| 2004/0078243 A1 | 4/2004 | Fisher et al. |
| 2004/0117254 A1 | 6/2004 | Nemirofsky et al. |
| 2004/0133653 A1 | 7/2004 | Defosse et al. |
| 2004/0139021 A1 | 7/2004 | Reed et al. |
| 2004/0148224 A1 | 7/2004 | Gauthier et al. |
| 2004/0153715 A1 | 8/2004 | Spaeth et al. |
| 2004/0186770 A1 | 9/2004 | Pettit et al. |
| 2004/0199470 A1 | 10/2004 | Ferry, Jr. et al. |
| 2004/0220964 A1 | 11/2004 | Shiftan et al. |
| 2004/0243519 A1 | 12/2004 | Perttila et al. |
| 2004/0249712 A1 | 12/2004 | Brown et al. |
| 2004/0254848 A1 | 12/2004 | Golan et al. |
| 2004/0260653 A1 | 12/2004 | Tsuei et al. |

(56) References Cited

U.S. PATENT DOCUMENTS

| | | | |
|---|---|---|---|
| 2004/0267618 A1* | 12/2004 | Judicibus | G06Q 20/00 705/16 |
| 2005/0021456 A1 | 1/2005 | Steele et al. | |
| 2005/0029344 A1 | 2/2005 | Davis | |
| 2005/0033688 A1 | 2/2005 | Peart et al. | |
| 2005/0035847 A1 | 2/2005 | Bonaile et al. | |
| 2005/0036611 A1 | 2/2005 | Seaton et al. | |
| 2005/0045718 A1 | 3/2005 | Bortolin et al. | |
| 2005/0058427 A1 | 3/2005 | Nguyen et al. | |
| 2005/0071225 A1 | 3/2005 | Bortolin et al. | |
| 2005/0071226 A1 | 3/2005 | Nguyen et al. | |
| 2005/0071227 A1 | 3/2005 | Hammad et al. | |
| 2005/0071228 A1 | 3/2005 | Bortolin et al. | |
| 2005/0071235 A1 | 3/2005 | Nguyen et al. | |
| 2005/0075958 A1 | 4/2005 | Gonzalez | |
| 2005/0097473 A1 | 5/2005 | Malik et al. | |
| 2005/0102233 A1 | 5/2005 | Park et al. | |
| 2005/0102234 A1 | 5/2005 | Devine | |
| 2005/0121506 A1 | 6/2005 | Gauthier et al. | |
| 2005/0131838 A1 | 6/2005 | Woodward | |
| 2005/0149455 A1 | 7/2005 | Bruesewitz et al. | |
| 2005/0154674 A1 | 7/2005 | Nicholls et al. | |
| 2005/0165864 A1 | 7/2005 | Martino | |
| 2005/0171898 A1 | 8/2005 | Bishop et al. | |
| 2005/0177510 A1 | 8/2005 | Hilt et al. | |
| 2005/0187873 A1 | 8/2005 | Labrou et al. | |
| 2005/0199714 A1 | 9/2005 | Brandt et al. | |
| 2005/0203856 A1 | 9/2005 | Russell | |
| 2005/0210387 A1 | 9/2005 | Alagappan et al. | |
| 2005/0213766 A1 | 9/2005 | Goss | |
| 2005/0219061 A1 | 10/2005 | Lai et al. | |
| 2005/0222933 A1 | 10/2005 | Wesby | |
| 2005/0222949 A1 | 10/2005 | Inotay et al. | |
| 2005/0283416 A1 | 12/2005 | Reid et al. | |
| 2005/0283430 A1 | 12/2005 | Reid et al. | |
| 2005/0283431 A1 | 12/2005 | Reid et al. | |
| 2005/0283432 A1 | 12/2005 | Reid et al. | |
| 2005/0283433 A1 | 12/2005 | Reid et al. | |
| 2006/0053056 A1 | 3/2006 | Alspach-Goss et al. | |
| 2006/0059110 A1 | 3/2006 | Madhok et al. | |
| 2006/0080243 A1 | 4/2006 | Kemper et al. | |
| 2006/0085260 A1 | 4/2006 | Yamagishi | |
| 2006/0111967 A1 | 5/2006 | Forbes | |
| 2006/0155644 A1 | 7/2006 | Reid et al. | |
| 2006/0163345 A1 | 7/2006 | Myers et al. | |
| 2006/0178957 A1 | 8/2006 | Leclaire | |
| 2006/0179007 A1 | 8/2006 | Davis | |
| 2006/0202025 A1 | 9/2006 | Calabrese et al. | |
| 2006/0206376 A1 | 9/2006 | Gibbs et al. | |
| 2006/0218086 A1 | 9/2006 | Campbell et al. | |
| 2006/0224449 A1 | 10/2006 | Byerley et al. | |
| 2006/0247981 A1 | 11/2006 | Singh et al. | |
| 2006/0248007 A1 | 11/2006 | Hofer et al. | |
| 2006/0253390 A1 | 11/2006 | McCarthy et al. | |
| 2006/0270421 A1 | 11/2006 | Phillips et al. | |
| 2006/0273163 A1 | 12/2006 | Gusler et al. | |
| 2006/0282382 A1 | 12/2006 | Balasubramanian et al. | |
| 2006/0290501 A1 | 12/2006 | Hammad et al. | |
| 2006/0293027 A1 | 12/2006 | Hammad et al. | |
| 2007/0001000 A1 | 1/2007 | Nguyen et al. | |
| 2007/0001001 A1 | 1/2007 | Myers et al. | |
| 2007/0005492 A1 | 1/2007 | Kim | |
| 2007/0005613 A1 | 1/2007 | Singh et al. | |
| 2007/0005774 A1 | 1/2007 | Singh et al. | |
| 2007/0012764 A1 | 1/2007 | Bortolin et al. | |
| 2007/0017970 A1 | 1/2007 | Gauthier et al. | |
| 2007/0022058 A1 | 1/2007 | Labrou et al. | |
| 2007/0034679 A1 | 2/2007 | Gauthier et al. | |
| 2007/0055597 A1 | 3/2007 | Patel et al. | |
| 2007/0055630 A1 | 3/2007 | Gauthier et al. | |
| 2007/0057034 A1 | 3/2007 | Gauthier et al. | |
| 2007/0057051 A1 | 3/2007 | Bortolin et al. | |
| 2007/0078761 A1 | 4/2007 | Kagan et al. | |
| 2007/0083465 A1 | 4/2007 | Ciurea et al. | |
| 2007/0100691 A1 | 5/2007 | Patterson | |
| 2007/0125842 A1 | 6/2007 | Antoo et al. | |
| 2007/0150387 A1 | 6/2007 | Seubert et al. | |
| 2007/0156436 A1 | 7/2007 | Fisher et al. | |
| 2007/0194104 A1 | 8/2007 | Fukuda et al. | |
| 2007/0194113 A1 | 8/2007 | Esplin et al. | |
| 2007/0203836 A1 | 8/2007 | Dodin | |
| 2007/0205270 A1 | 9/2007 | Kemper et al. | |
| 2007/0241180 A1* | 10/2007 | Park | G06Q 20/20 235/379 |
| 2007/0241189 A1 | 10/2007 | Slavin et al. | |
| 2007/0243856 A1 | 10/2007 | Fougnies et al. | |
| 2007/0244811 A1 | 10/2007 | Tumminaro | |
| 2007/0250380 A1 | 10/2007 | Mankoff | |
| 2007/0276764 A1 | 11/2007 | Mann, III et al. | |
| 2007/0288373 A1 | 12/2007 | Wilkes | |
| 2008/0003987 A1 | 1/2008 | Mechaley | |
| 2008/0006685 A1 | 1/2008 | Rackley et al. | |
| 2008/0010193 A1 | 1/2008 | Rackley, III et al. | |
| 2008/0021784 A1 | 1/2008 | Hessburg et al. | |
| 2008/0040265 A1 | 2/2008 | Rackley, III et al. | |
| 2008/0058014 A1 | 3/2008 | Khan et al. | |
| 2008/0064383 A1 | 3/2008 | Nath et al. | |
| 2008/0114657 A1 | 5/2008 | Forzley | |
| 2008/0116264 A1 | 5/2008 | Hammad et al. | |
| 2008/0118069 A1 | 5/2008 | Yang et al. | |
| 2008/0120182 A1 | 5/2008 | Arnold et al. | |
| 2008/0126145 A1 | 5/2008 | Rackley, III et al. | |
| 2008/0133366 A1 | 6/2008 | Evans et al. | |
| 2008/0133409 A1 | 6/2008 | Eastley et al. | |
| 2008/0147546 A1 | 6/2008 | Weichselbaumer et al. | |
| 2008/0154727 A1 | 6/2008 | Carlson | |
| 2008/0154735 A1 | 6/2008 | Carlson | |
| 2008/0154772 A1 | 6/2008 | Carlson | |
| 2008/0163257 A1 | 7/2008 | Carlson | |
| 2008/0167017 A1 | 7/2008 | Carlson et al. | |
| 2008/0167988 A1 | 7/2008 | Sun et al. | |
| 2008/0167991 A1 | 7/2008 | Carlson et al. | |
| 2008/0183480 A1 | 7/2008 | Carlson et al. | |
| 2008/0201226 A1 | 8/2008 | Carlson et al. | |
| 2008/0208681 A1 | 8/2008 | Hammad et al. | |
| 2008/0208762 A1 | 8/2008 | Arthur et al. | |
| 2008/0228611 A1 | 9/2008 | Lilly et al. | |
| 2008/0270246 A1 | 10/2008 | Chen | |
| 2008/0288404 A1 | 11/2008 | Pirzadeh et al. | |
| 2008/0300973 A1 | 12/2008 | Dewitt et al. | |
| 2008/0313047 A1* | 12/2008 | Casares | G06Q 20/10 705/17 |
| 2008/0319843 A1 | 12/2008 | Moser et al. | |
| 2009/0012886 A1 | 1/2009 | Allin et al. | |
| 2009/0018924 A1* | 1/2009 | Roberts | G06Q 20/10 705/21 |
| 2009/0018954 A1 | 1/2009 | Roberts | |
| 2009/0076896 A1 | 3/2009 | DeWitt et al. | |
| 2009/0076925 A1 | 3/2009 | DeWitt et al. | |
| 2009/0078777 A1 | 3/2009 | Granucci et al. | |
| 2009/0083159 A1 | 3/2009 | Maw | |
| 2009/0084840 A1 | 4/2009 | Williams et al. | |
| 2009/0094125 A1 | 4/2009 | Killian et al. | |
| 2009/0098825 A1 | 4/2009 | Huomo et al. | |
| 2009/0112721 A1 | 4/2009 | Hammad et al. | |
| 2009/0112765 A1 | 4/2009 | Skowronek | |
| 2009/0119170 A1 | 5/2009 | Hammad et al. | |
| 2009/0143104 A1 | 6/2009 | Loh et al. | |
| 2009/0182634 A1 | 7/2009 | Park et al. | |
| 2009/0193253 A1 | 7/2009 | Falk et al. | |
| 2009/0202081 A1 | 8/2009 | Hammad et al. | |
| 2009/0314840 A1 | 12/2009 | Granucci et al. | |
| 2010/0030651 A1* | 2/2010 | Matotek | G06Q 20/105 705/17 |
| 2010/0042540 A1 | 2/2010 | Graves et al. | |
| 2010/0057620 A1* | 3/2010 | Li | G06Q 20/202 705/71 |
| 2010/0211498 A1 | 8/2010 | Aabye et al. | |
| 2010/0211504 A1 | 8/2010 | Aabye et al. | |
| 2010/0211507 A1 | 8/2010 | Aabye et al. | |
| 2010/0217709 A1 | 8/2010 | Aabye et al. | |
| 2010/0223165 A1* | 9/2010 | Calman | G06Q 40/02 705/30 |
| 2011/0112964 A1 | 5/2011 | Berntsen et al. | |

(56) References Cited

U.S. PATENT DOCUMENTS

| | | | |
|---|---|---|---|
| 2011/0119184 | A1 | 5/2011 | Singhal |
| 2011/0161182 | A1 | 6/2011 | Racco |
| 2011/0161230 | A1 | 6/2011 | Singh |
| 2011/0225075 | A1 | 9/2011 | Maw et al. |
| 2011/0276511 | A1 | 11/2011 | Rosenberg |
| 2012/0029990 | A1 | 2/2012 | Fisher |
| 2012/0203646 | A1 | 8/2012 | Morgan et al. |
| 2013/0060647 | A1 | 3/2013 | Aabye et al. |
| 2013/0060706 | A1 | 3/2013 | Aabye et al. |

FOREIGN PATENT DOCUMENTS

| | | |
|---|---|---|
| EP | 1280115 | 1/2003 |
| GB | 2348781 | 11/2003 |
| KR | 200276208 | 5/2002 |
| KR | 100773918 | 11/2007 |
| KR | 100914513 | 9/2009 |
| KR | 101039696 | 6/2011 |
| KR | 101092657 | 12/2011 |
| KR | 101138938 | 4/2012 |
| KR | 101184865 | 9/2012 |
| KR | 101195182 | 10/2012 |
| RU | 2173505 | 9/2001 |
| RU | 2285294 | 10/2006 |
| WO | 9613814 | 5/1996 |
| WO | 9712461 | 4/1997 |
| WO | 9745814 | 12/1997 |
| WO | 9951038 | 10/1999 |
| WO | 0003328 | 1/2000 |
| WO | 0077697 | 12/2000 |
| WO | 2004077369 | 9/2004 |
| WO | 2005052869 | 6/2005 |
| WO | 2006024080 | 3/2006 |
| WO | 2007145540 | 12/2007 |

OTHER PUBLICATIONS

U.S. Appl. No. 12/563,444, "Final Office Action", dated Jun. 29, 2015, 7 pages.
U.S. Appl. No. 13/662,371, "Non-Final Office Action", dated Sep. 11, 2015, 13 pages.
Proximity Mobile Payments: Leveraging NFC and the Contactless Financial Payments Infrastructure, A Smart Card Alliance Contactless Payments Council White Paper, Smart Card Alliance, www.smartcardalliance.org, Sep. 2007.
U.S. Appl. No. 12/563,410, Final Office Action dated May 1, 2012, 12 pages.
U.S. Appl. No. 12/563,410, Final Office Action dated Dec. 26, 2014, 13 pages.
U.S. Appl. No. 12/563,410, Non-Final Office Action dated Sep. 4, 2014, 12 pages.
U.S. Appl. No. 12/563,410, Non-Final Office Action dated Mar. 6, 2014, 16 pages.
U.S. Appl. No. 12/563,410, Non-Final Office Action dated Nov. 28, 2011, 9 pages.
U.S. Appl. No. 12/563,421, Advisory Action dated Apr. 8, 2015, 4 pages.
U.S. Appl. No. 12/563,421, Final Office Action dated Oct. 30, 2012, 17 pages.
U.S. Appl. No. 12/563,421, Final Office Action dated Sep. 4, 2014, 22 pages.
U.S. Appl. No. 12/563,421, Final Office Action dated Jan. 16, 2015, 22 pages.
U.S. Appl. No. 12/563,421, Non-Final Office Action dated Jan. 10, 2014, 19 pages.
U.S. Appl. No. 12/563,421, Non Final Office Action dated Mar. 30, 2012, 18 pages.
U.S. Appl. No. 12/563,421, Restriction Requirement dated Dec. 29, 2011, 6 pages.
U.S. Appl. No. 12/563,430, Final Office Action dated Sep. 26, 2012, 39 pages.
U.S. Appl. No. 12/563,430, Non-Final Office Action dated Mar. 15, 2012, 36 pages.
U.S. Appl. No. 12/563,430, Non-Final Office Action dated Jun. 19, 2014, 50 pages.
U.S. Appl. No. 12/563,430, Notice of Allowance dated Oct. 29, 2014, 21 pages.
U.S. Appl. No. 12/563,444, Final Office Action dated Jul. 25, 2012, 10 pages.
U.S. Appl. No. 12/563,444, Non-Final Office Action dated Dec. 11, 2014, 5 pages.
U.S. Appl. No. 12/563,444, Non-Final Office Action dated Jun. 17, 2014, 13 pages.
U.S. Appl. No. 12/563,444, Non-Final Office Action dated Feb. 8, 2012, 8 pages.
U.S. Appl. No. 13/662,371, Final Office Action dated Dec. 26, 2014, 15 pages.
U.S. Appl. No. 13/662,371, Non-Final Office Action dated Aug. 1, 2014, 11 pages.
U.S. Appl. No. 13/662,371, Non-Final Office Action dated Apr. 20, 2015, 14 pages.
Mexican Application No. MX/A/2011/003060, Office Action dated Feb. 14, 2014, 2 pages.
Mexican Application No. MX/A/2011/003060, Office Action dated Sep. 26, 2013, 5 pages.
International Application No. PCT/US2009/057791, International Preliminary Report on Patentability dated Mar. 22, 2011, 6 pages.
International Application No. PCT/US2009/057791, International Search Report and Written Opinion dated Nov. 9, 2009, 9 pages.
International Application No. PCT/US2009/057794, International Preliminary Report on Patentability dated Mar. 22, 2011, 7 pages.
International Application No. PCT/US2009/057794, International Search Report and Written Opinion dated Jan. 8, 2010, 13 pages.
International Application No. PCT/US2009/057799, International Preliminary Report on Patentability dated Mar. 31, 2011, 8 pages.
International Application No. PCT/US2009/057799, International Search Report and Written Opinion dated Nov. 10, 2009, 8 pages.
International Application No. PCT/US2009/057802, International Preliminary Report on Patentability dated Mar. 22, 2011, 6 pages.
International Application No. PCT/US2009/057802, International Search Report and Written Opinion dated Nov. 19, 2009, 9 pages.
Russian Application No. 2011113671, Office Action dated Oct. 4, 2013, 6 pages.
U.S. Appl. No. 13/662,843, Non-Final Office Action dated Jan. 21, 2016, 9 pages.

\* cited by examiner

RECORDATION OF ELECTRONIC PAYMENT TRANSACTION INFORMATION

CROSS-REFERENCES TO RELATED APPLICATIONS

This application is a continuation of U.S. application Ser. No. 12/563,430, filed Sep. 21, 2009, titled "Recordation of Electronic Payment Transaction Information," which application claims the benefit of U.S. Provisional Patent Application No. 61/099,060, entitled "Contactless Phone With Secret Data," filed Sep. 22, 2008, the contents of which are hereby incorporated in their entirety by reference for all purposes.

BACKGROUND

Embodiments of the present invention are directed to systems, apparatuses and methods for enabling electronic payment transactions, and more specifically, to a system and associated apparatus and method for providing additional, consumer generated information regarding a transaction to an Issuer so that a consumer can utilize that information when reviewing their account statement. The information may assist a consumer to better identify valid transactions and hence reduce the number of transactions that are reported as potentially fraudulent, thereby conserving resources of the Issuer or payment processor. Embodiments of the present invention are further directed to systems, apparatuses, and methods for using a contactless element such as an integrated circuit chip embedded in a wireless mobile device to enable payment transactions.

Consumer payment devices are used by millions of people worldwide to facilitate various types of commercial transactions. In a typical transaction involving the purchase of a product or service at a merchant location, the payment device is presented at a point of sale terminal ("POS terminal") located at a merchant's place of business. The POS terminal may be a card reader or similar device that is capable of accessing data stored on the payment device, where this data may include identification or authentication data, for example. Some or all of the data read from the payment device is provided to the merchant's transaction processing system and then to the Acquirer, which is typically a bank or other institution that manages the merchant's account. The data provided to the Acquirer may then be provided to a payment processing network that is in communication with data processors that process the transaction data to determine if the transaction should be authorized by the network, and assist in the clearance and account settlement functions for the transaction. The authorization decision and clearance and settlement portions of the transaction may also involve communication and/or data transfer between the payment processing network and the bank or institution that issued the payment device to the consumer (the Issuer).

Although a consumer payment device may be a credit or debit card, it may also take the form of a "smart" card or chip. A smart card is generally defined as a pocket-sized card (or other portable payment device) that is embedded with a microprocessor and one or more memory chips, or is embedded with one or more memory chips with non-programmable logic. The microprocessor type card typically can implement certain data processing functions, such as to add, delete, or otherwise manipulate information stored in a memory location on the card. In contrast, the memory chip type card (for example, a prepaid phone card) can typically only act as a file to hold data that is manipulated by a card reading device to perform a pre-defined operation, such as debiting a charge from a pre-established balance stored in the memory. Smart cards, unlike magnetic stripe cards (such as standard credit cards), can implement a variety of functions and can contain a variety of types of information on the card. Therefore, in some applications they may not require access to remote databases for the purpose of user authentication or record keeping at the time of a transaction. A smart chip is a semiconductor device that is capable of performing most, if not all, of the functions of a smart card, but may be embedded in another device.

Smart cards or chips come in two general varieties; the contact type and the contactless type. A contact type smart card or chip is one that includes a physical element (e.g., a contact plate or similar element) that enables access to the data and functional capabilities of the card, typically via some form of terminal or card reader. A contactless smart card or chip is a device that incorporates a means of communicating with the card reader or point of sale terminal without the need for direct contact. Thus, such devices may effectively be "swiped" (i.e., waved or otherwise presented in a manner that results in enabling communication between the contactless element and a reader or terminal) by passing them close to a card reader or terminal. Contactless cards or chips typically communicate with a card reader or terminal using RF (radio-frequency) technology, wherein proximity to the reader or terminal causes data transfer between the card or chip and the reader or terminal. Contactless cards have found uses in banking and other applications, where they have the advantage of not requiring removal from a user's wallet or pocket in order to participate in a transaction. A contactless card or chip may be embedded in, or otherwise incorporated into, a mobile device such as a mobile phone or personal digital assistant (PDA). Further, because of the growing interest in such cards, standards have been developed that govern the operation and interfaces for contactless smart cards, such as the ISO 14443 standard.

In a typical payment transaction, data is sent from a point of sale terminal to the Issuer to authenticate a consumer and obtain authorization for the transaction. As part of the authentication or authorization processes, the data may be accessed or processed by other elements of the transaction processing system (e.g., the merchant's Acquirer or a payment processor that is part of a payment processing network). Note that in some cases, authorization for the transaction may be obtained without connecting to the Issuer; this may be permitted by Issuer configured risk management parameters that have been set on the consumer's payment application or payment device. If the proposed transaction is authorized, then the consumer may provide other information to the merchant as part of completing the transaction. After clearance and settlement of a transaction, the Issuer typically updates its transaction records for the relevant account and provides a record of all finalized transactions to the account holder on a regular basis in the form of a monthly statement, bill or other format.

However, upon receipt of the transaction record (such as a credit card account statement or bill), it can be difficult for an account holder to verify that a listed transaction is valid. This may occur, for example, because the transaction is listed under a business name that is not familiar to the account holder because it does not correspond to the name of the business where the transaction took place. This situation may occur where a parent corporation owns franchises operating under multiple brand names. The inability of an account holder to be certain of the validity of a transaction can lead to dissatisfaction on the account holder's part, and can increase the account holder's use of Issuer resources in the areas of consumer relations or investigating potentially fraudulent transactions.

What is desired is a system, apparatus and method for providing an account holder with additional information to assist them in identifying valid transactions in an account statement or bill, and which overcomes the noted disadvantages of current approaches. Embodiments of the invention address these problems and other problems individually and collectively.

BRIEF SUMMARY

Embodiments of the present invention are directed to a system, apparatus, and method for enabling electronic payment transactions by providing additional transaction related information on a consumer's account statement or bill. In some embodiments, upon activation of a payment application installed on a mobile device or initiation of a payment transaction, the device user is provided with an opportunity to append transaction related data to a transaction identifier or record. The appended transaction related data may be in the form of a photograph, GPS location data, a map, a voice recording, a text message, or other suitable format. The transaction related data may serve to identify the merchant where the transaction took place, or to provide the account holder with information that helps them recollect the transaction. The transaction related data generated by the account holder is linked or associated with a transaction identifier or other transaction data provided by a merchant. The transaction related data and identifier are then provided to the Issuer, typically using a wireless phone network as the data transport channel. The Issuer can store the transaction related data along with its other records for the transaction and provide that data (or if more suitable, a link to enable access to that data) as part of the account statement. The transaction related data may also be stored in the mobile device and be made available to the account holder for review after receipt of the account statement. The mobile device may be a mobile phone, PDA, or other suitable device and may incorporate a contactless element that is used to participate in payment transactions.

In one embodiment, the present invention is directed to a mobile device for use in conducting a payment transaction, where the mobile device includes a processor, a memory, and a set of instructions stored in the memory, which when executed by the processor implement a method to receive an input from a user activating a function of the mobile device to generate additional payment transaction related information, and provide the additional payment transaction related information to an entity responsible for processing payment transaction data, wherein the additional payment transaction related information assists the user to recollect the circumstances of the transaction.

In another embodiment, the present invention is directed to a method of performing a payment transaction, where the method includes conducting the payment transaction using a payment device, wherein the payment device includes a contactless element and is contained in a mobile phone, generating additional payment transaction related information using a function of the mobile phone, wherein the additional payment transaction related information assists the user to recollect the circumstances of the transaction, and providing the additional payment transaction related information to an entity responsible for processing payment transaction data, the additional payment transaction related information being provided using a wireless phone network.

In yet another embodiment, the present invention is directed to a system for performing a payment transaction, where the system includes a mobile wireless phone configured to execute a process to conduct a payment transaction in response to communication with a terminal using a near field communications mechanism, generate a request to a user of the mobile phone asking the user if they wish to generate additional information related to the payment transaction, activate a function of the mobile wireless phone to generate the additional information related to the transaction, associate the additional information with an identifier for the payment transaction, and transfer the additional information and the associated identifier over a wireless network, and a server configured to execute a process to receive the additional information and the associated identifier, process the received additional information, generate an account statement for the user, and present the account statement to the user, wherein the account statement includes the additional transaction related information or a mechanism for accessing the additional transaction related information.

Other objects and advantages of embodiments of the present invention will be apparent to one of ordinary skill in the art upon review of the detailed description of the present invention and the included figures.

DETAILED DESCRIPTION

Embodiments of the present invention are directed to a system, apparatus, and method for processing payment transactions that are conducted using a mobile device that includes a contactless element, such as an integrated circuit chip. Embodiments of the invention enable an account holder to generate transaction related data and append that data to a transaction record or transaction identifier. The appended data and transaction record or identifier may be stored in the mobile payment device, and if desired, provided to an Issuer. If provided to an Issuer, the transaction related data generated by the account holder may be used to supplement an account statement. Whether stored in the device or provided to an Issuer, the additional information generated by the account holder may be used to assist the account holder in determining if a transaction is valid by providing information that helps the account holder to recall the location or another aspect of the transaction.

Embodiments of the present invention are typically implemented in the context of a payment transaction; therefore prior to describing one or more embodiments of the invention in greater detail, a brief discussion of the entities involved in processing and authorizing a payment transaction, and their roles in the authorization process will be presented.

Figure 1:
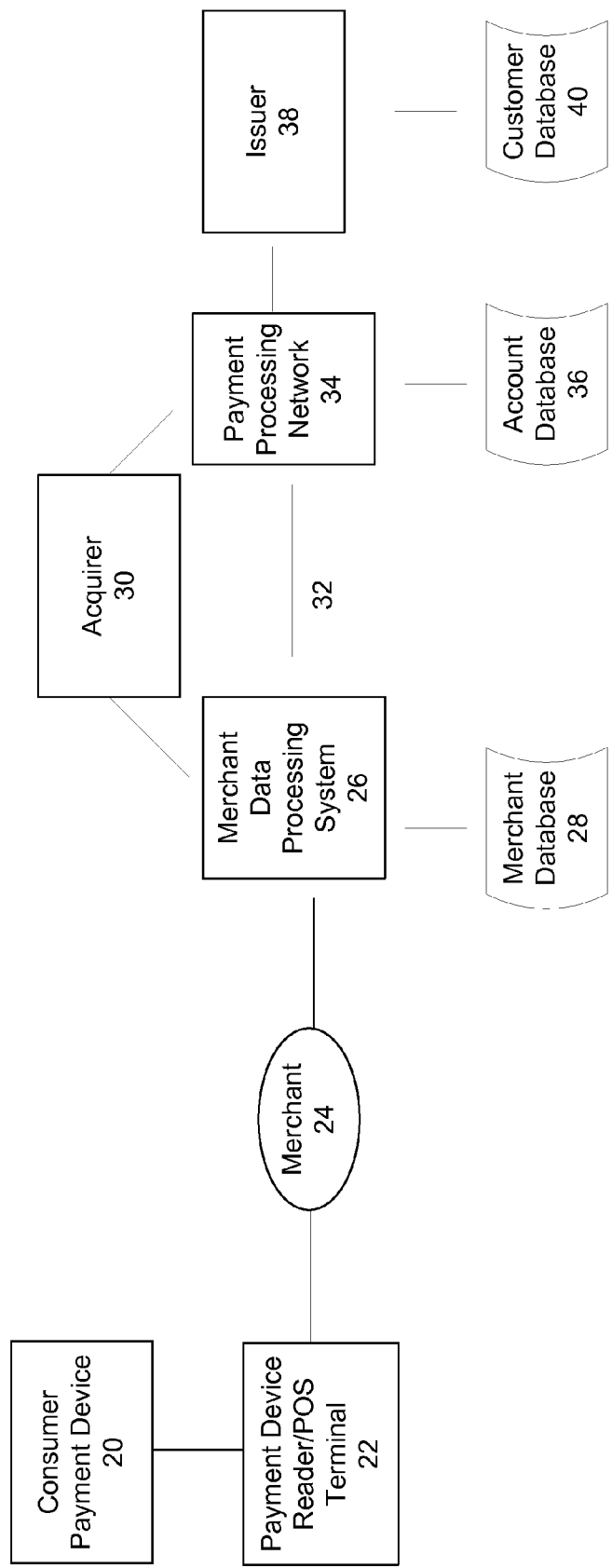
FIG. 1 is a block diagram illustrating a transaction processing system that may be used with some embodiments of the present invention.

FIG. 1 is a block diagram illustrating a transaction processing system that may be used with some embodiments of the present invention. Typically, an electronic payment transaction is authorized if the consumer conducting the transaction is properly authenticated (i.e., their identity and their valid use of a payment account is verified) and has sufficient funds or credit to conduct the transaction. Conversely, if there are insufficient funds or credit in the consumer's account, or if the consumer's payment device is on a negative list (e.g., it is indicated as possibly having been stolen), then an electronic payment transaction may not be authorized. In the following description, an "Acquirer" is typically a business entity (e.g., a commercial bank) that has a business relationship with a particular merchant. An "Issuer" is typically a business entity (e.g., a bank) which issues a payment device such as a credit or debit card to a consumer. Some entities may perform both Issuer and Acquirer functions.

FIG. 1 illustrates the primary functional elements that are typically involved in processing a payment transaction and in the authorization process for such a transaction. As shown in FIG. 1, in a typical payment transaction, a consumer wishing to purchase a good or service from a merchant uses a portable consumer payment device 20 to provide payment transaction data that may be used in an authorization process. Portable consumer payment device 20 may be a debit card, credit card, contact or contactless smart card, mobile device containing a contactless chip, or other suitable form of device.

The portable consumer payment device is presented to a device reader or point of sale (POS) terminal 22 which is able to access data stored on or within the payment device. The account data (as well as any required consumer provided data) is communicated to the merchant 24 and ultimately to the merchant's transaction/data processing system 26. As part of the authorization process performed by the merchant, merchant transaction processing system 26 may access merchant database 28, which typically stores data regarding the customer/consumer (as the result of a registration process with the merchant, for example), the consumer's payment device, and the consumer's transaction history with the merchant. Merchant transaction processing system 26 typically communicates with Acquirer 30 (which manages the merchant's accounts) as part of the overall authorization process. Merchant transaction processing system 26 and/or Acquirer 30 provide data to Payment Processing Network 34, which among other functions, participates in the clearance and settlement processes that are part of the overall transaction processing. Communication and data transfer between Merchant transaction processing system 26 and Payment Processing Network 34 is typically by means of an intermediary, such as Acquirer 30. As part of the transaction authorization process, Payment Processing Network 34 may access account database 36, which typically contains information regarding the consumer's account history, payment, chargeback or dispute history, credit worthiness, etc. Payment Processing Network 34 communicates with Issuer 38 as part of the authorization process, where Issuer 38 is the entity that issued the payment device to the consumer and manages the consumer's account. Customer or consumer account data is typically stored in customer/consumer database 40 which may be accessed by Issuer 38 as part of the authentication, authorization or account management processes. Note that instead of, or in addition to being stored in account database 36, consumer account data may be included in, or otherwise part of customer/consumer database 40.

In standard operation, a transaction authorization request message is created during a consumer purchase of a good or service at a point of sale (POS) using a portable consumer payment device (such as a credit or debit card). In some embodiments, the portable consumer payment device may be a wireless phone that incorporates a contactless card or chip. The contactless card or chip may communicate with the point of sale terminal using a near field communications (NFC) capability (such as RF, infrared, optical, etc.). The authorization request message is typically sent from the device reader/POS terminal 22 through the merchant's data processing system 26 to the merchant's Acquirer 30, to a payment processing network 34, and then to an Issuer 38. An authorization request message can include a request for authorization to conduct an electronic payment transaction. It may include one or more of an account holder's payment account number, currency code, sale amount, merchant transaction stamp, acceptor city, acceptor state/country, etc. An authorization request message may be protected using a secure encryption method (e.g., 128-bit SSL or equivalent) in order to prevent data from being compromised.

After the Issuer receives the authorization request message, the Issuer determines if the transaction should be authorized and sends an authorization response message back to the payment processing network to indicate whether or not the current transaction is authorized. The payment processing system then forwards the authorization response message to the Acquirer. The Acquirer then sends the response message to the Merchant. The Merchant is thus made aware of whether the Issuer has authorized the transaction, and hence whether the transaction can be completed.

At a later time, a clearance and settlement process may be conducted by the payment/transaction processing system. A clearance process involves exchanging financial details between an Acquirer and an Issuer to facilitate posting a transaction to a consumer's account and reconciling the consumer's settlement position. Clearance and settlement can occur simultaneously or as separate processes.

Payment Processing Network 34 may include data processing subsystems, networks, and other means of implementing operations used to support and deliver authorization services, exception file services, and clearing and settlement services for payment transactions. An exemplary Payment Processing Network may include VisaNet. Payment Processing Networks such as VisaNet are able to process credit card transactions, debit card transactions, and other types of commercial transactions. VisaNet, in particular, includes a VIP system (Visa Integrated Payments system) which processes authorization requests and a Base II system which performs clearing and settlement services.

Payment Processing Network 34 may include a server computer. A server computer is typically a powerful computer or cluster of computers. For example, the server computer can be a large mainframe, a minicomputer cluster, or a group of servers functioning as a unit. In one example, the server computer may be a database server coupled to a web server. Payment Processing Network 34 may use any suitable combination of wired or wireless networks, including the Internet, to permit communication and data transfer between network elements. Among other functions, Payment Processing Network 34 may be responsible for ensuring that a user is authorized to conduct the transaction (via an authentication process), confirm the identity of a party to a transaction (via receipt of a personal identification number), confirm a sufficient balance or credit line to permit a purchase, or reconcile the amount of a purchase with the user's account (via entering a record of the transaction amount, date, etc.).

Consumer payment device 20 may take one of many suitable forms. As mentioned, the portable consumer device can be a mobile device that incorporates a contactless element such as a chip for storing payment data (e.g., a BIN number, account number, etc.) and a near field communications (NFC) data transfer element such as an antenna, a light emitting diode, a laser, etc. The portable consumer device may also include a keychain device (such as the Speedpass™ commercially available from Exxon-Mobil Corp.), etc. The device containing the contactless card or chip, or other data storage element may be a cellular (mobile) phone, personal digital assistant (PDA), pager, transponder, or the like. The portable consumer device may incorporate the ability to perform debit functions (e.g., a debit card), credit functions (e.g., a credit card), or stored value functions (e.g., a stored value or pre-paid card).

In embodiments of the invention that include a contactless element embedded within a wireless mobile phone or similar device, the contactless element can communicate with a Merchant's device reader or point of sale terminal using a short range communication method, such as a near field communications (NFC) capability. Examples of such NFC technologies or similar short range communications technologies include ISO standard 14443, RFID, Bluetooth™ and Infra-red communications methods.

Figure 2:
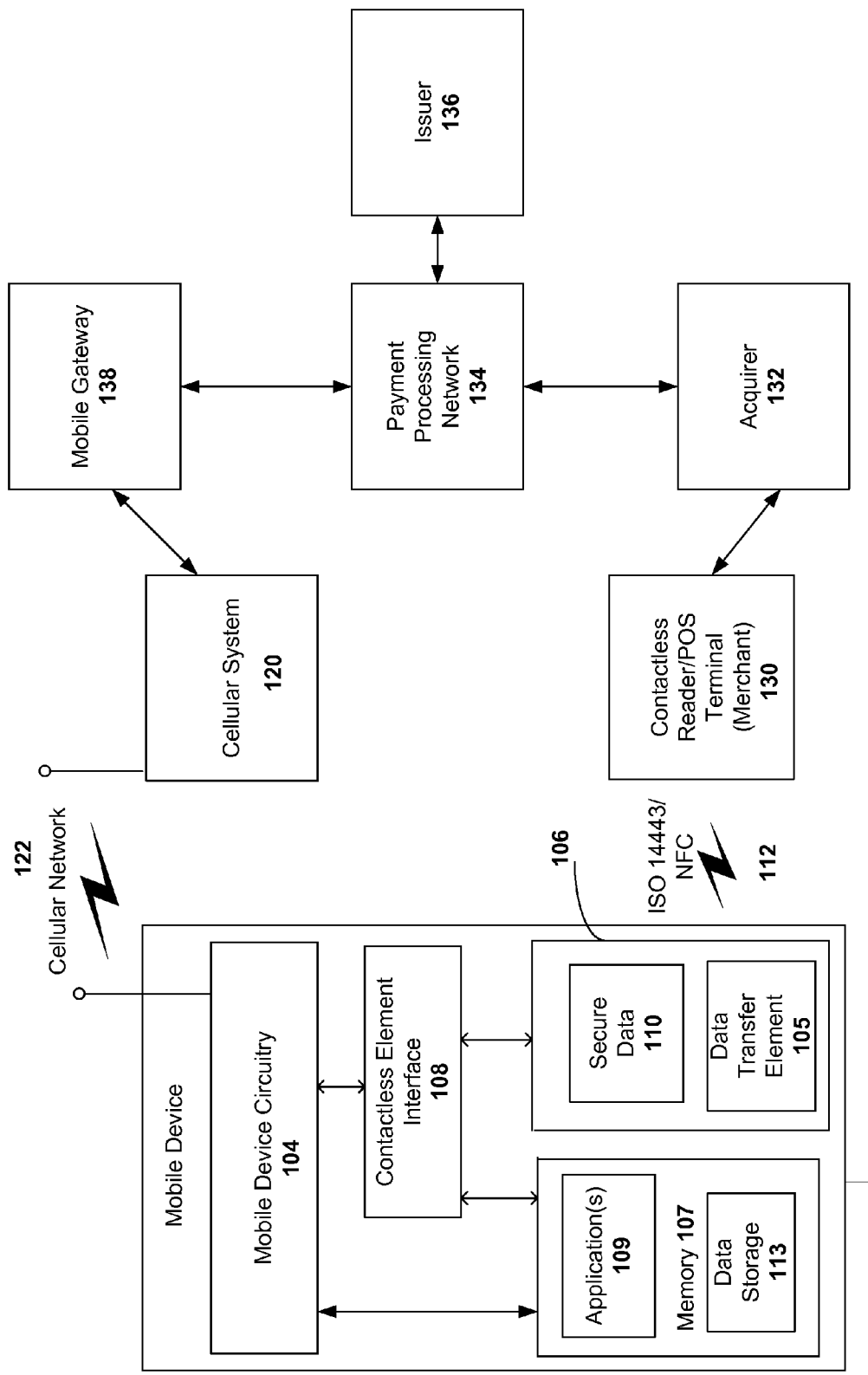
FIG. 2 is a functional block diagram illustrating the primary components of a system for providing additional transaction related information on a consumer's account statement or bill for a transaction that uses a contactless element contained within a mobile device, in accordance with an embodiment of the present invention.

FIG. 2 is a functional block diagram illustrating the primary components of a system 100 for providing additional transaction related information on a consumer's account statement or bill for a transaction that uses a contactless element contained within a mobile device, in accordance with an embodiment of the present invention. As shown in FIG. 2, system 100 includes a mobile device 102 having wireless communications capabilities 122. Mobile device 102 may be a wireless mobile telephone, PDA, laptop computer, pager, etc. In a typical embodiment, mobile device 102 is a cell phone, although as noted, implementation of the present invention is not limited to this embodiment. In the case of a cell phone as the mobile device 102, the device includes mobile device (cell phone) circuitry 104 that enables certain of the telephony functions. Among other functions, mobile device circuitry 104 enables mobile device 102 to communicate wirelessly with cellular system (i.e., a wireless carrier) 120 via cellular network 122.

Mobile device 102 further includes a contactless element 106, typically implemented in the form of a semiconductor chip. Contactless element 106 may include a secure data storage element 110, although secure data storage element 110 may also be implemented as an element that is separate from contactless element 106. Contactless element 106 includes a near field communications (NFC) data transfer (e.g., data transmission) element 105, such as an antenna or transducer. Contactless element 106 is typically embedded within and integrated with the elements of mobile device 102, and data or control instructions transmitted via cellular network 122 may be exchanged with or applied to contactless element 106 by means of contactless element interface 108. Contactless element interface 108 functions to permit the exchange of data and/or control instructions between mobile device circuitry 104 (and hence the cellular network) and contactless element 106. Thus, contactless element 106 may include data storage capability in the form of a memory or secure data storage 110 that may be accessed via interface 108 to permit the implementation of data read, write, and erase functions, for example.

Secure data storage 110 may be used by mobile device 102 to store operating parameters or other data utilized in the operation of the device. Secure data storage 110 may also be used to store other data for which enhanced security is desired; for example, transaction data, personal account data, identification data, authentication data, access control data for an application or device function, executable code for an application, etc. As mentioned, secure data storage 110 may be implemented in the form of a chip that is separate and apart from contactless element 106, or alternatively, may be a section of memory in a chip that forms part of contactless element 106. Note also that the secure data storage and/or contactless element contained within the mobile device may be a removable element or may be integrated within the mobile device. Examples of removable elements include SIM cards, flash memory cards, and other suitable memory devices.

Mobile device 102 may also include one or more applications 109, where applications 109 are implemented in the form of one or more of software, firmware, or hardware. Applications 109 are used to implement various functions desired by a user, where such functions may include, but are not limited to, eCommerce transaction operations, transaction payment operations, location determination, messaging, etc. Typically, applications 109 represent processes or operations that are dedicated to a specific function that provides added value to the user and which are not part of the standard operation of the device (e.g., in the case of a mobile phone, not part of enabling the standard telephony functions). As shown in the figure, applications 109 may exchange data with secure data storage 110 (via contactless element interface 108) and may also be capable of exchanging data with mobile device circuitry 104. A typical application 109 for the purposes of describing an embodiment of the present invention is a payment application that enables a user to make payments for a transaction, where the transaction is wholly or partially executed using the mobile device. In such an example, secure data storage 110 may contain authentication data, user identification data, transaction record data, account balance data, executable code for an application, etc. Applications 109 are typically stored as a set of executable instructions in memory 107, which may also include data storage 113 (although, as noted, an application or part of an application may also be stored in secure data storage 110). A processor accesses memory 107 to load and unload the instructions and data as needed to execute the instructions and perform the functions of the applications. In some embodiments, mobile device 102 may also include an application that enables the device to determine its location based on communicating with a global positioning satellite (GPS) system, elements of the wireless network infrastructure, another suitable technology, or a combination of the technologies.

Contactless element 106 is capable of transferring and receiving data using data transfer element 105 which implements a near field communications capability 112, typically in accordance with a standardized protocol or data transfer mechanism (identified as ISO 14443/NFC in the figure). Near field communications capability 112 is a short-range communications capability; examples include the ISO 14443 standard, RFID, Bluetooth™, infra-red, or other data transfer mechanism that can be used to exchange data between the mobile device 102 and a device reader or point of sale terminal 130, which is typically located at a Merchant's place of business. Thus, mobile device 102 is capable of communicating and transferring data and/or control instructions via both cellular network 122 and near field communications capability 112.

System 100 further includes Acquirer 132 which is in communication with Merchant or Merchant's reader or point of sale terminal 130. Acquirer 132 is also capable of communication with Payment Processing Network 134 and as was described, may exchange data with Payment Processing Network 134 as part of the transaction authorization process. Payment Processing Network 134 is also capable of communication with Issuer 136. As was described, Issuer 136 may exchange data with Payment Processing Network 134 as part of the transaction authorization or transaction reconciliation process.

System 100 may also include Mobile Gateway 138, which is capable of coupling the cellular (wireless) network or system to a second network (typically a wireline network such as the Internet) and enabling the transfer of data between the networks. Mobile Gateway 138 may perform data processing operations as needed to permit the efficient transfer of data between the two types of networks, including, but not limited to, data reformatting or other processing to take into account differences in network protocols. Mobile Gateway 138 may also perform data processing operations to enable more efficient data transfer between the networks and devices coupled to each type of network, such as for purposes of improving the ability of a user to utilize the received data on a mobile device. As shown in the figure, in some embodiments, Mobile Gateway 138 is coupled to Payment Processing Network 134, which is coupled to Acquirer 130. Note that other embodiments are possible, such as where Mobile Gateway 138 is coupled to Issuer 136, as well as where Acquirer 130 is coupled to Issuer 136. Similarly, Issuer 136 may include the capability of functioning as Mobile Gateway 138.

Inventive system 100 provides an efficient way for a user to perform one or more of initiating, executing, or paying for a transaction using a contactless element. By integrating the contactless element with the mobile device's telephony communications capabilities, the cellular network may be used as a data transfer channel between an Issuer or Payment Processing Network element and the user's mobile device. In some embodiments, the system may be used to enable an account holder to generate additional data related to a payment transaction that will assist the account holder to verify that the transaction is valid when the account holder reviews an account statement, such as a credit or debit card bill. The additional data may be stored in a mobile payment device and/or provided to an Issuer of the payment device for inclusion on the account statement. The additional data may be provided to the Issuer over the wireless cellular network or using the near field communications capability of a contactless element in the user's device. Upon receipt of the account statement, the additional data may be accessed from storage on the user's device or viewed as part of the statement (or may be accessed in accordance with information provided as part of the statement). The additional data may take the form of any suitable data that is relevant to assisting the account holder to determine if the transaction is a valid one, and may include, but is not limited to a photograph or similar image, merchant location data (e.g., based on a GPS or network derived position fix of the user's mobile device at the time of the transaction), a voice or other audio recording, a text message, etc.

Figure 3:
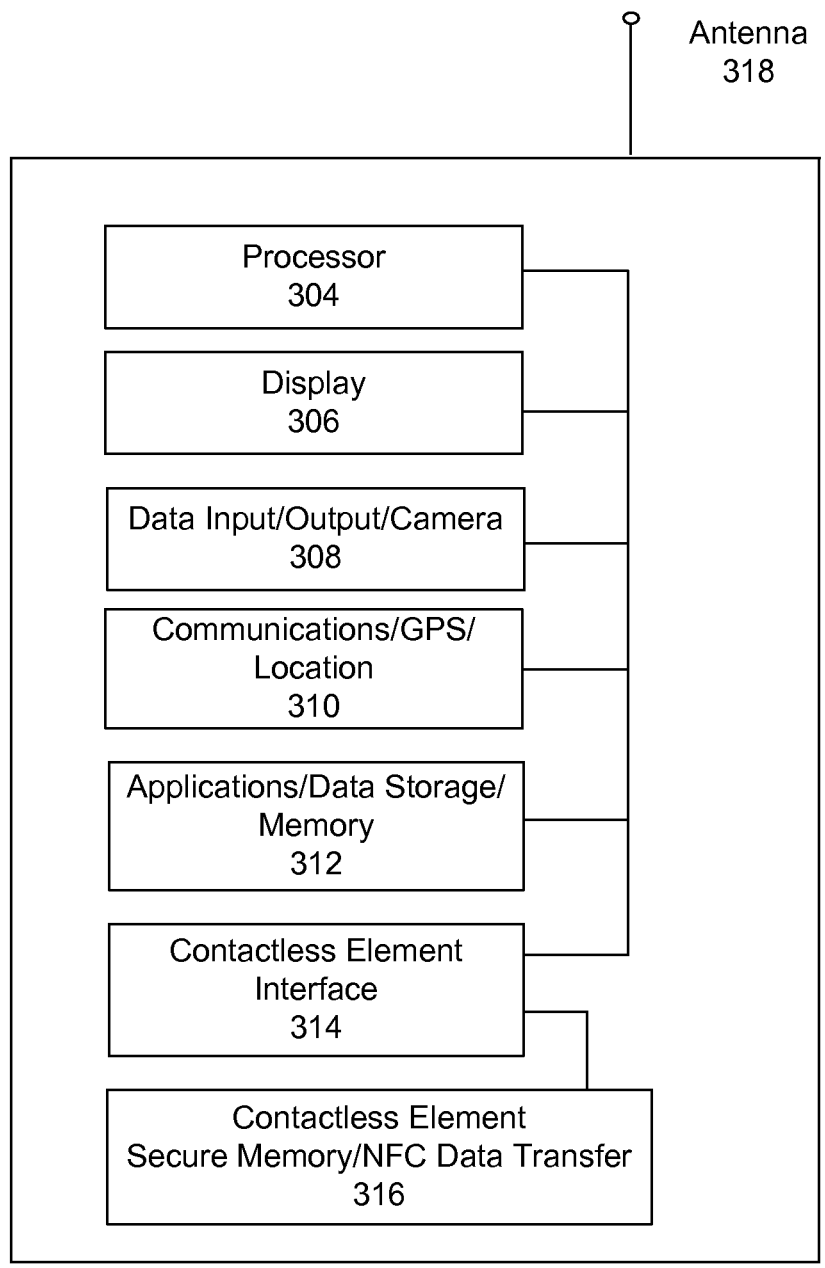
FIG. 3 is a functional block diagram illustrating the primary components of a mobile device, such as a mobile phone that may be used as part of the inventive system and method.

As discussed, in some embodiments, mobile device 102 may be a device capable of communication and data transfer with a cellular network and with a near field communication system. As noted, one example is a mobile wireless phone. FIG. 3 is a functional block diagram illustrating the primary components of a portable consumer device (e.g., element 102 of FIG. 2), such as a mobile phone that may be used as part of the inventive system and method. As illustrated in FIG. 3, mobile device 302 may include circuitry that is used to enable certain telephony and other device functions. The functional elements responsible for enabling those functions may include a processor 304 for executing instructions that implement the functions and operations of the device. Processor 304 may access data storage 312 (or another suitable memory region or element) to retrieve instructions and/or data used in executing the instructions. Data input/output elements 308 may be used to enable a user to input data (via a microphone, camera, or keyboard, for example) or receive output data (via a speaker, for example). Display 306 may also be used to output data to a user. Communications element 310 may be used to enable data transfer between device 302 and a wireless network (via antenna 318, for example) to assist in enabling telephony and data transfer functions. Communications element 310 may also include hardware, software, firmware, or a combination of such elements that enable the device to determine its location using a suitable location determining technology. Such technologies include, but are not limited to, GPS, network infrastructure, cell location, etc. As described with reference to FIG. 2, device 302 may also include contactless element interface 314 to enable data transfer between contactless element 316 and other elements of the device, where contactless element 316 may include a secure memory and a near field communications data transfer element.

Data storage 312 may be a memory that stores data, and may be in any suitable form including a memory chip, etc. The memory may be used to store data such as user identification or authentication information, user account information, transaction data, etc. Stored financial information may include information such as bank account information, bank identification number (BIN), credit or debit card number information, account balance information, expiration date, consumer information such as name, date of birth, etc. Note that such data may instead, or in addition be stored in a secure data storage element such as secure data storage 110 of FIG. 2, or in a secure memory that is part of contactless element 316. As described, data storage 312 may also contain instructions which when executed by processor 304 implement operations or processes that are part of the operation of the device.

Figure 4:
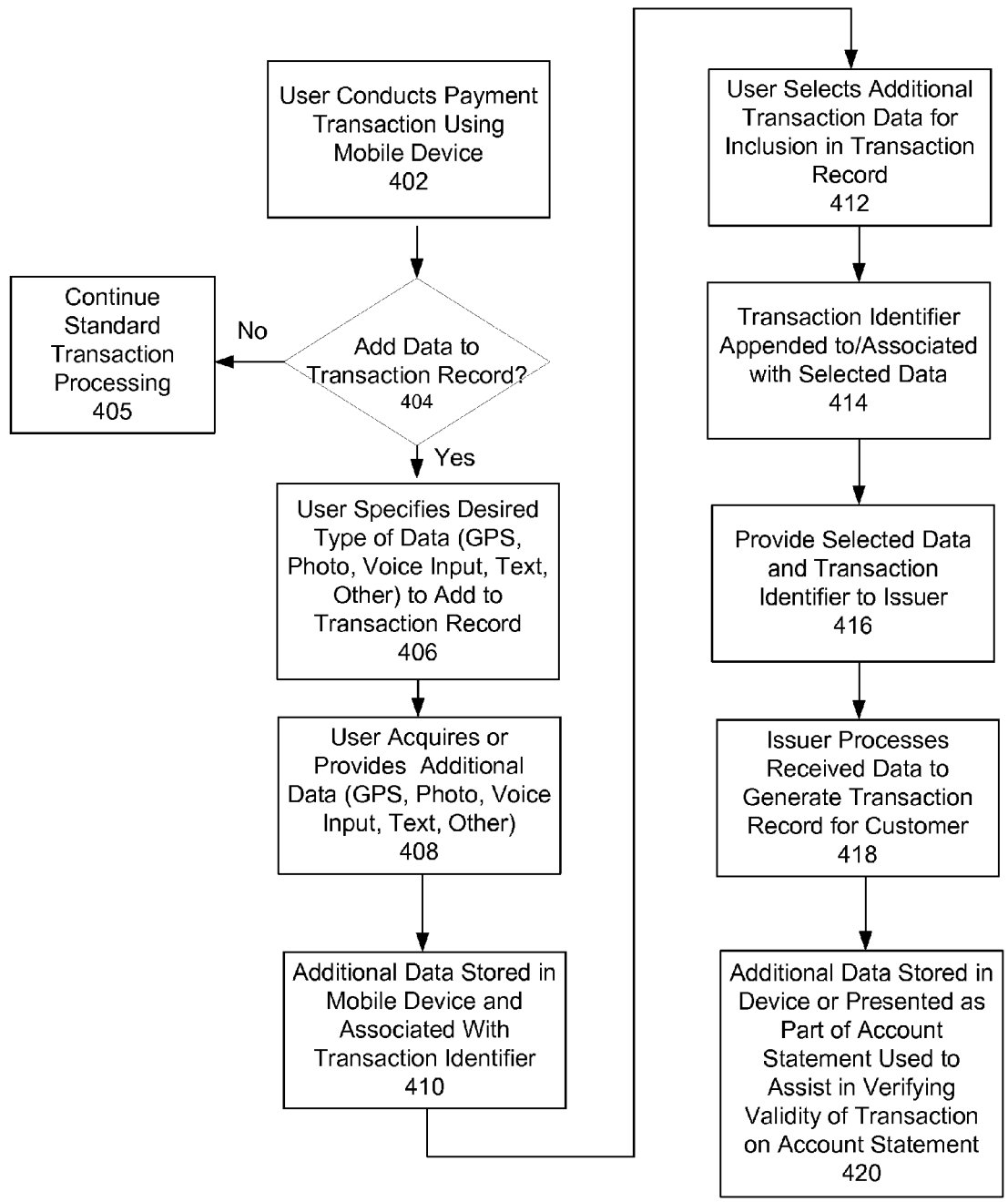
FIG. 4 is a flowchart illustrating an embodiment of the inventive method or process for assisting an account holder to verify the validity of a payment transaction by generating additional transaction related data, in accordance with some embodiments of the present invention.

FIG. 4 is a flowchart illustrating a method or process for assisting an account holder to verify the validity of a payment transaction by generating additional transaction related data, in accordance with some embodiments of the present invention. The process steps or stages illustrated in the figure may be implemented as an independent routine or process, or as part of a larger routine or process. Note that each process step or stage depicted may be implemented as an apparatus that includes a processor executing a set of instructions, a method, or a system, among other embodiments.

As shown in the figure, a user participates in a payment transaction using a mobile device (stage 402). Examples of suitable mobile devices include, but are not limited to, element 102 of FIG. 2 or element 302 of FIG. 3. In some embodiments, the user may activate a payment application installed on the device (such as element 109 of FIG. 2, or element 312 of FIG. 3) in order to enable data to be provided to a merchant device reader or point of sale terminal (e.g., element 130 of FIG. 2) as part of the transaction. Depending on the situation, the payment device may be used to initiate, provide data used as part of an authentication and/or authorization process, or otherwise participate in a transaction as a result of communication between the payment device and a Merchant device reader or point of sale terminal (element 130 of FIG. 2). For example, a merchant may ask that a consumer "swipe" (i.e., wave, tap, or otherwise present) their mobile device near a device reader or point of sale terminal in order to provide data needed to process a request for a transaction.

The payment device may be a mobile wireless phone or similar device that includes a contactless element, for example. As discussed, the contactless element (e.g., element 106 of FIG. 2 or element 316 of FIG. 3) is capable of communication and data transfer using a near field communications capability. The transaction may be executed in part by passing the payment device near the device reader or point of sale terminal to permit the payment device and the reader or terminal to establish communications and exchange data. In a typical interaction, data stored in the payment device is provided to the device reader or point of sale terminal. The data may include user identification data, account data, or other data required by a Merchant to authenticate a user and permit the user to participate in a transaction. The Merchant may provide certain transaction data (a transaction identifier, an authorization code, a description of certain aspects of the transaction) to the mobile device via the device reader or point of sale terminal.

As has been described, in some embodiments, the mobile device is in the form of a mobile phone that is capable of communication and data transfer with a cellular network and a near field communication system. If the mobile payment device is in the form of a device other than a mobile phone, it may be capable of transferring data using a wireless cellular network, a near field communications capability, or both methods. If the device is a mobile phone, it may incorporate one or more of the ability to capture images (i.e., a camera), determine its location (e.g., a GPS or network location fix), receive information about its present location from a network infrastructure element, record a voice recording, generate a text message or other form of document, or other suitable means of generating and storing transaction related data. If the device is not a mobile phone it may incorporate one or more of the types of data generation methods described.

At stage 404 the payment device user is asked if they want to add transaction related data to the transaction record. This query is typically presented to the user in the form of a question displayed on a display of the device (such as display 306 of FIG. 3). As described, one purpose of the added data is to assist the account holder (the payment device user) to verify that a transaction listed on an account statement is a valid transaction. If the user does not desire to add transaction related data to the transaction record, then the processing of the transaction proceeds as it would in a standard or normal situation (stage 405). However, if the user does desire to add transaction related data to the transaction record, then the user may be asked to specify what type of data they wish to provide as part of the transaction record (stage 406). The additional data may take any suitable or relevant form, including but not limited to, a location determination (via GPS or network infrastructure fix), an image or photo of the transaction location or something reminiscent of that location, a voice recording describing an aspect of the transaction, a text document describing an aspect of the transaction, etc. In some embodiments, the GPS or other form of location determination may be used to trigger the generation of a map that is associated with the transaction, with the map being stored in the mobile device and/or provided to the Issuer or another suitable entity.

Next the user acquires or provides the additional transaction data (stage 408). This may occur by triggering an application, function or operation, inputting data using a keyboard or microphone, capturing an image using a camera contained in the device, preparing a text document or message, etc. In a typical example, the additional information is provided by a data input mechanism of the device (such as element 308 of FIG. 3), or by activating a function installed on the device (such as an application stored in memory 312 of FIG. 3 or a location determining function 310 of FIG. 3). The acquired or generated data is then stored in the payment device (stage 410) (typically in a data storage element or secure data storage element), and optionally may be associated with an identifier for the transaction. The identifier may be input by the user from the keyboard, microphone, or other input device, or may be provided as a result of communication with the merchant. If provided by communication with the merchant, the transaction identifier may be provided by transmission over the cellular network or the near field communications capability. The transaction identifier may be supplied separately from, or as part of other transaction data provided to the device.

After acquiring or generating the transaction related data, the user may be asked to select which of the stored transaction related data they desire to append to the transaction record (stage 412). To facilitate this, a transaction identifier may be appended to, or otherwise associated with the selected data (stage 414). This provides a way to enable a later recipient of the data (e.g., the Issuer or payment processor) to maintain a record of the additional transaction related data in a way that associates that data with the transaction to which it applies. Note that this step may not be necessary if the stored data was previously associated with a transaction identifier in a format that the recipient can understand and process, so that accessing the stored transaction related data provides the identifier in a suitable format. The selected transaction related data and identifier may optionally be provided to the Issuer, payment processor or another suitable entity so that the additional information can be processed and supplied to the account holder as part of an account statement (stage 416). This may be accomplished using a wireless communications network (such as the cellular system 122 of FIG. 2 in the case of a mobile phone containing the payment device), or by a near field communications capability (such as element 112 of FIG. 2) as a result of data transfer using a merchant's terminal or device reader. For example, the selected transaction related data and the identifier may pass from a mobile device directly to the Issuer or from a payment processing organization to the Issuer via a mobile communications network. In another example, the selected transaction related data and the identifier may pass from a mobile device directly to the merchant's POS (point of sale) terminal and then to the Issuer via a payment processing network and merchant acquirer.

The transaction related data provided to the Issuer is processed by the Issuer as part of generating a record of the transaction for the consumer (the account holder), as shown at stage 418. This processing may serve to format the data or otherwise prepare it for presentation to the account holder as part of an account statement or bill. For example, the transaction related data may be provided as an addendum to the data normally provided as part of the transaction record on an account statement. It may be presented as part of an additional field or comment section for the transaction. In the case of an image or photograph, the information may be provided in the form of a link to a web-site from which the image or photo may be accessed, or as a thumbnail image that is part of the statement.

When the account holder receives their payment account statement, they may use the additional transaction related data to assist them in verifying that a transaction listed on the statement is a valid transaction (stage 420). The additional information may be provided by the Issuer as part of the account statement, or may be accessed by the account holder from a memory that is part of the payment device (such as a payment application memory that is part of a mobile phone). In either case the additional transaction related information may assist the account holder to recollect the circumstances of the transaction and hence overcome any uncertainty they may have with regards to the validity of the transaction. This is particularly advantageous in circumstances in which there is uncertainty as to whether a transaction is valid due to ambiguity in the merchant identification information provided on the statement.

The following is an example of a typical use case or scenario in which the inventive system, apparatus and methods may be used. It is noted that the use case is only exemplary, as other use cases or scenarios are possible and will be evident to those of skill in the art.

In one use case or scenario, a user visits a store to purchase food or another type of product. The store is part of a chain of stores having the same name and general appearance (such as a "fast-food" or convenience store franchise). The user pays for the transaction using their mobile payment device, which includes a contactless element and a payment application. The contactless element may include a pre-paid balance stored in memory from which the amount of a transaction is deducted. The contactless element may include account data for a debit or credit account which is used to pay for the transaction. After initiating the transaction, the payment application may ask the user if they wish to generate or acquire additional information regarding the transaction that can be associated with the transaction. If the user replies in the affirmative, the payment application (or another application installed on the mobile device) may ask the user to indicate what type of additional information they wish to generate or acquire. After the user indicates the desired type of additional information, the mobile device may activate (or request that the user activate) an application or function to permit that information to be generated (as in the case of a text message, voice recording, photograph, etc.) or acquired (as in the case of a location determination, etc.).

After the additional information is generated or acquired, the payment application may cause the information to be stored in the mobile device, along with a transaction identifier or transaction data received from a merchant. At a later time (such as after the transaction is completed), the payment application may ask the user if they wish to provide the additional information to the Issuer, transaction processor, payment processor, or another suitable entity. If the user replies in the affirmative, then the payment application may cause the additional information and transaction identifier to be transmitted to the entity via either the wireless network or the near field communications mechanism. If the user does not desire to provide the additional information to the Issuer, etc., then the information may remain stored in the mobile device for later access by the user when the user is reviewing their account statement. If the information is transmitted to the Issuer, transaction processor, payment processor, or other suitable entity, etc., then the information, a subset of the information, or a link to the information may be provided to the user as part of their account statement.

Note that in addition to providing a user with additional transaction related information that may be used to assist in verifying the validity of a transaction, embodiments of the present invention may also be used as part of a system for detecting potentially fraudulent transactions (e.g., as part of a transaction authorization process). As an example, if a location determination is associated with a first transaction that is performed using a mobile device and if a second transaction is initiated later using a different method at a location that is sufficiently distant, then it may be the case that one of the two transactions is fraudulent. In such a situation a challenge response or other request for additional verification data may be issued prior to authorizing a transaction.

Figure 5:
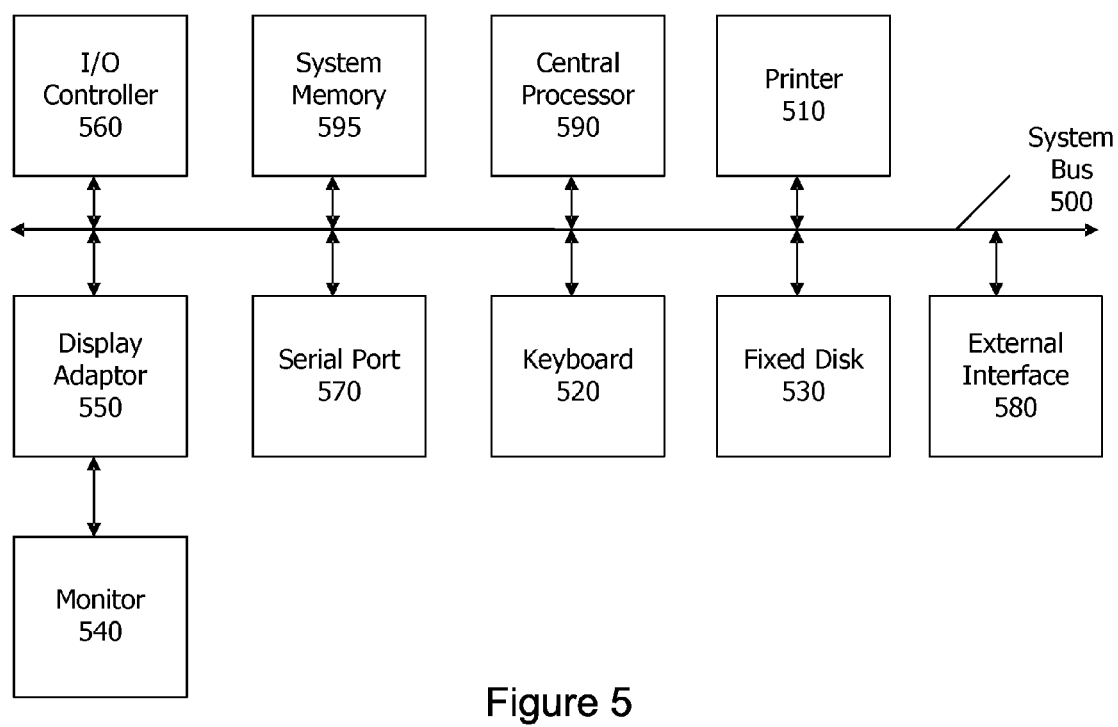
FIG. 5 is a block diagram of an exemplary computing apparatus that may be used to implement an embodiment of the inventive method or process for assisting an account holder to verify the validity of a payment transaction by providing additional transaction related information on a consumer's account statement or bill.

FIG. 5 is a block diagram of an exemplary computing apparatus that may be used to implement an embodiment of the inventive method or process for assisting an account holder to verify the validity of a payment transaction by providing additional transaction related information on a consumer's account statement or bill. The elements of the computing apparatus illustrated in FIG. 5 may be used to implement the inventive processes, methods, or operations in whole or in part, and may be part of a server or other computing apparatus (e.g., a mobile device, a mobile gateway, an Issuer managed server, etc.). The subsystems shown in FIG. 5 are interconnected via a system bus 500. Additional subsystems such as a printer 510, keyboard 520, fixed disk 530 (or other memory comprising computer readable media), monitor 540, which is coupled to display adapter 550, and others are shown. Peripherals and input/output (I/O) devices, which couple to I/O controller 560, can be connected to the computer system by any number of means known in the art, such as serial port 570. For example, serial port 570 or external interface 580 can be used to connect the computer apparatus to a wide area network such as the Internet, a mouse input device, or a scanner. The interconnection via system bus allows the central processor 590 to communicate with each subsystem and to control the execution of instructions from system memory 595 or the fixed disk 530, as well as the exchange of information between subsystems. The system memory 595 and/or the fixed disk 530 may embody a computer readable medium.

In accordance with embodiments of the present invention there have been described a system, apparatuses, and methods for enabling use of a mobile device that includes a contactless element in a payment transaction. In some embodiments, the contactless element is embedded within a mobile device that is capable of communication and data transfer over a cellular network and using a near field communications capability. The contactless element may include a secure data storage region that is used to store authentication data, transaction data, account data, etc. The cellular network may be used to provide additional transaction related information over the air to an Issuer to enable that information to be provided to a user of the mobile device as part of a payment account statement, and thereby to assist the user in verifying the validity of a transaction.

It should be understood that embodiments of the present invention as described above can be implemented in the form of control logic using computer software in a modular or integrated manner. Based on the disclosure and teachings provided herein, a person of ordinary skill in the art will know and appreciate other ways and/or methods to implement embodiments of the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A computer-implemented method for recordation of electronic payment transaction information, comprising:
   receiving, at an entity responsible for processing payment transaction data, from a point of sale terminal, through a first communication channel, a first data structure comprising a transaction record generated by the point of sale terminal responsive to a payment transaction conducted with a mobile device at a physical location of the point of sale terminal, the generated transaction record comprising a transaction identifier;
   receiving, at the entity responsible for processing payment transaction data, from the mobile device, through a second communication channel distinct from the first communication channel, a second data structure comprising a copy of the transaction identifier and additional payment transaction related information, the additional payment transaction related information generated at the physical location and time of the payment transaction utilizing a sensor of the mobile device and independently of the point of sale terminal, wherein the additional payment transaction related information: (i) is additional with respect to the transaction record, (ii) comprises sensor information with respect to at least one aspect of the physical location obtained at least in part with the sensor function of the mobile device and (iii) has at least one characteristic that assists a user of the mobile device to recollect the circumstances of the payment transaction;
   creating, at the entity responsible for processing payment transaction data, a third data structure corresponding to an association of the additional payment transaction related information with the independently obtained transaction record based at least in part on (i) the transaction identifier in the generated transaction record of the first data structure and (ii) the copy of the transaction identifier in the second data structure;
   receiving, at a time subsequent to the occurrence of the payment transaction conducted with the mobile device, an independent request initiated by the user of the mobile device with respect to one or more transaction records including the transaction record;
   determining, in response to the independent request initiated by the user of the mobile device, the transaction identifier of the transaction record based at least in part on the transaction identifier in the generated transaction record of the first data structure;
   determining, in response to the independent request initiated by the user of the mobile device, the additional payment transaction related information associated with the transaction record based at least in part on the determined transaction identifier and the third data structure that is based at least in part on (i) the transaction identifier in the generated transaction record of the first data structure and (ii) the copy of the transaction identifier in the second data structure; and
   providing, in response to the independent request initiated by the user of the mobile device, a fourth data structure comprising at least a portion of the transaction record and the determined additional payment transaction related information such that the additional payment transaction related information is presented to the user of the mobile device along with the at least a portion of the transaction record, the presentation based at least in part on the determined additional payment transaction related information including the sensor information with respect to at least one aspect of the physical location obtained at least in part with the sensor function of the mobile device that has at least one characteristic that assists a user of the mobile device to recollect the circumstances of the payment transaction.

2. A computer-implemented method in accordance with claim 1, wherein the mobile device comprises a wireless mobile phone.

3. A computer-implemented method in accordance with claim 1, wherein the additional payment transaction related information is generated responsive to an explicit user indication that the user desires to generate additional payment transaction related information for the payment transaction.

4. A computer-implemented method in accordance with claim 1, wherein the payment transaction occurs in response to communication between the mobile device and the point of sale terminal utilizing a near field communications mechanism.

5. A computer-implemented method in accordance with claim 1, wherein the first communication channel comprises a payment processing network.

6. A computer-implemented method in accordance with claim 1, wherein the first communication channel comprises a payment processing network and the second communication channel comprises a wireless phone network.

7. A computer-implemented method in accordance with claim 1, wherein the sensor of the mobile device comprises a camera and the additional payment transaction related information comprises visual information with respect to the at least one aspect of the physical location.

8. A computerized system for recordation of electronic payment transaction information, comprising:
one or more computers responsible for processing payment transaction data communicatively coupled with a point of sale terminal through a first communication channel and with a mobile device through a second communication channel distinct from the first communication channel, the point of sale terminal configured at least to generate a transaction record responsive to a payment transaction conducted with the mobile device at a physical location of the point of sale terminal, the generated transaction record comprising a transaction identifier, the one or more computers configured to, at least:
receive from the point of sale terminal, through the first communication channel, a first data structure comprising the generated transaction record;
receive from the mobile device, through the second communication channel, a second data structure comprising a copy of the transaction identifier and additional payment transaction related information, the additional payment transaction related information generated at the physical location and time of the payment transaction utilizing a sensor of the mobile device and independently of the point of sale terminal, wherein the additional payment transaction related information: (i) is additional with respect to the transaction record, (ii) comprises sensor information with respect to at least one aspect of the physical location obtained at least in part with the sensor function of the mobile device and (iii) has at least one characteristic that assists a user of the mobile device to recollect the circumstances of the payment transaction;
create a third data structure corresponding to an association of the additional payment transaction related information with the independently obtained transaction record based at least in part on (i) the transaction identifier in the generated transaction record of the first data structure and (ii) the copy of the transaction identifier in the second data structure;
receive, at a time subsequent to the occurrence of the payment transaction conducted with the mobile device, an independent request initiated by the user of the mobile device with respect to one or more transaction records including the transaction record;
determine, in response to the independent request initiated by the user of the mobile device, the transaction identifier of the transaction record based at least in part on the transaction identifier in the generated transaction record of the first data structure;
determine, in response to the independent request initiated by the user of the mobile device, the additional payment transaction related information associated with the transaction record based at least in part on the determined transaction identifier and the third data structure that is based at least in part on (i) the transaction identifier in the generated transaction record of the first data structure and (ii) the copy of the transaction identifier in the second data structure; and
provide, in response to the independent request initiated by the user of the mobile device, a fourth data structure comprising at least a portion of the transaction record and the determined additional payment transaction related information such that the additional payment transaction related information is presented to the user of the mobile device along with the at least a portion of the transaction record, the presentation based at least in part on the determined additional payment transaction related information including the sensor information with respect to at least one aspect of the physical location obtained at least in part with the sensor function of the mobile device that has at least one characteristic that assists a user of the mobile device to recollect the circumstances of the payment transaction.

9. A computerized system in accordance with claim 8, wherein the additional payment transaction related information is presented to the user in a context of an account statement that includes the payment transaction.

10. A computerized system in accordance with claim 9, wherein the account statement includes a link to a web-site from which the additional information related to the payment transaction may be accessed by the user.

11. A computerized system in accordance with claim 8, wherein the transaction record further comprises an account holder's payment account number, a currency code, a sale amount, and a merchant transaction stamp.

12. A computerized system in accordance with claim 8, wherein the additional payment transaction related information is generated for later viewing by the user of the mobile device.

13. A computerized system in accordance with claim 8, wherein the additional payment transaction related information assists the user to recollect the circumstances of the transaction at least in part by including the sensor information with respect to at least one aspect of the physical location obtained coincident with the payment transaction.

14. A computerized system in accordance with claim 8, wherein the sensor of the mobile device comprises a camera and the additional payment transaction related information comprises visual information with respect to the at least one aspect of the physical location.

15. One or more non-transitory computer readable media having thereon computer executable instructions that, when executed by one or more computers, collectively cause the one or more computers to, at least:
receive, from a point of sale terminal, through a first communication channel, a first data structure comprising a transaction record generated by the point of sale terminal responsive to a payment transaction conducted with a mobile device at a physical location of the point of sale terminal, the generated transaction record comprising a transaction identifier;
receive, from the mobile device, through a second communication channel distinct from the first communication channel, a second data structure comprising a copy of the transaction identifier and additional payment transaction related information, the additional payment transaction related information generated at the physical location and time of the payment transaction utilizing a sensor of the mobile device and independently of the point of sale terminal, wherein the additional payment transaction related information: (i) is additional with respect to the transaction record, (ii) comprises sensor information with respect to at least one aspect of the physical location obtained at least in part with the sensor function of the mobile device and (iii)

has at least one characteristic that assists a user of the mobile device to recollect the circumstances of the payment transaction;

create a third data structure corresponding to an association of the additional payment transaction related information with the independently obtained transaction record based at least in part on (i) the transaction identifier in the generated transaction record of the first data structure and (ii) the copy of the transaction identifier in the second data structure;

receive, at a time subsequent to the occurrence of the payment transaction conducted with the mobile device, an independent request initiated by the user of the mobile device with respect to one or more transaction records including the transaction record;

determine, in response to the independent request initiated by the user of the mobile device, the transaction identifier of the transaction record based at least in part on the transaction identifier in the generated transaction record of the first data structure;

determine, in response to the independent request initiated by the user of the mobile device, the additional payment transaction related information associated with the transaction record based at least in part on the determined transaction identifier and the third data structure that is based at least in part on (i) the transaction identifier in the generated transaction record of the first data structure and (ii) the copy of the transaction identifier in the second data structure; and provide, in response to the independent request initiated by the user of the mobile device, a fourth data structure comprising at least a portion of the transaction record and the determined additional payment transaction related information such that the additional payment transaction related information is presented to the user of the mobile device along with the at least a portion of the transaction record, the presentation based at least in part on the determined additional payment transaction related information including the sensor information with respect to at least one aspect of the physical location obtained at least in part with the sensor function of the mobile device that has at least one characteristic that assists a user of the mobile device to recollect the circumstances of the payment transaction.

16. One or more non-transitory computer readable media in accordance with claim 15, wherein generation of the additional payment transaction related information at the physical location and time of the payment transaction reduces a rate at which the payment transaction is reported as potentially fraudulent by the user.

17. One or more non-transitory computer readable media in accordance with claim 15, wherein the payment transaction is detected as potentially fraudulent based at least in part on the additional payment transaction related information generated at the physical location by the mobile device.

18. One or more non-transitory computer readable media in accordance with claim 17, wherein the payment transaction is detected as potentially fraudulent as part of a process of authorizing the payment transaction.

19. One or more non-transitory computer readable media in accordance with claim 15, wherein the generated additional payment transaction related information is modified to incorporate the transaction identifier thereby enabling association of the newly generated additional payment transaction related information with the payment transaction for which the additional payment transaction related information was generated.

20. One or more non-transitory computer readable media in accordance with claim 15, wherein the sensor of the mobile device comprises a camera and the additional payment transaction related information comprises visual information with respect to the at least one aspect of the physical location.

* * * * *